June 4, 1968  R. W. HANSON  3,386,432
BARBEQUE GRILL
Filed June 22, 1966  3 Sheets-Sheet 1
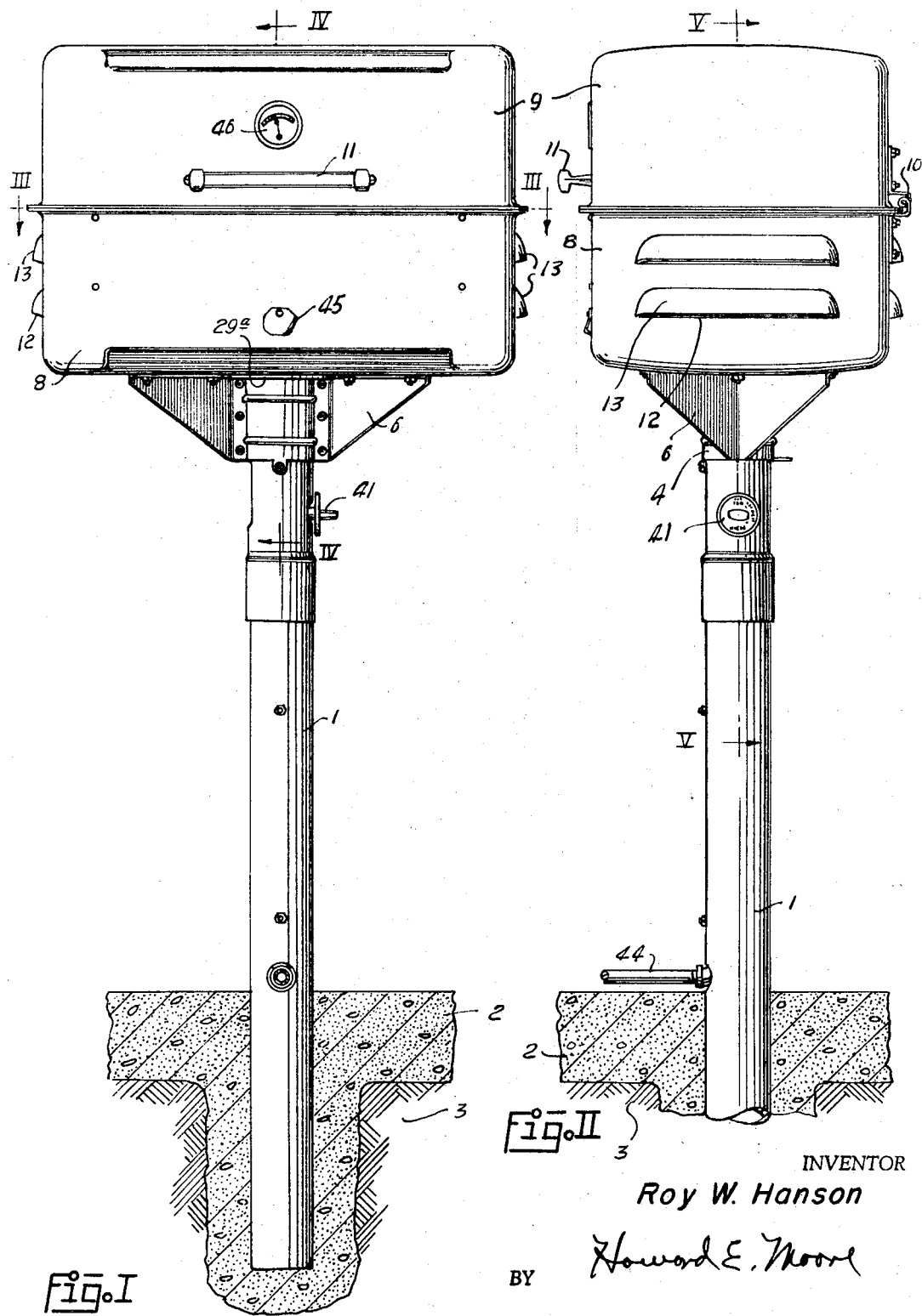
INVENTOR
Roy W. Hanson
BY Howard E. Moore
ATTORNEY June 4, 1968 R. W. HANSON 3,386,432
BARBEQUE GRILL
Filed June 22, 1966 3 Sheets-Sheet 2
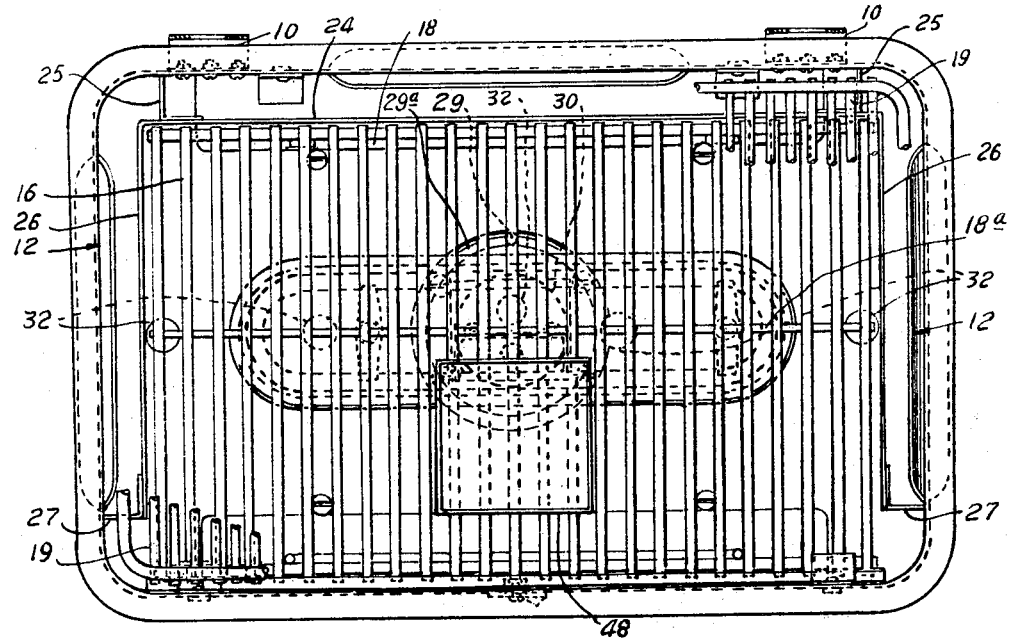
Fig. III
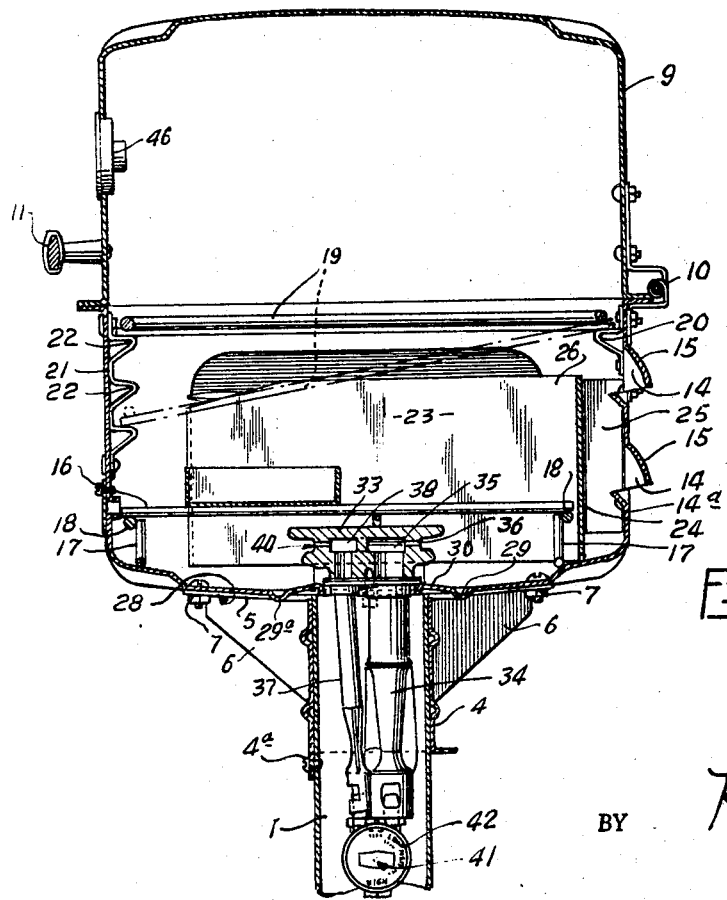
Fig. IV
INVENTOR
Roy W. Hanson
BY Howard E. Moore
ATTORNEY June 4, 1968  R. W. HANSON  3,386,432
BARBEQUE GRILL
Filed June 22, 1966  3 Sheets-Sheet 3
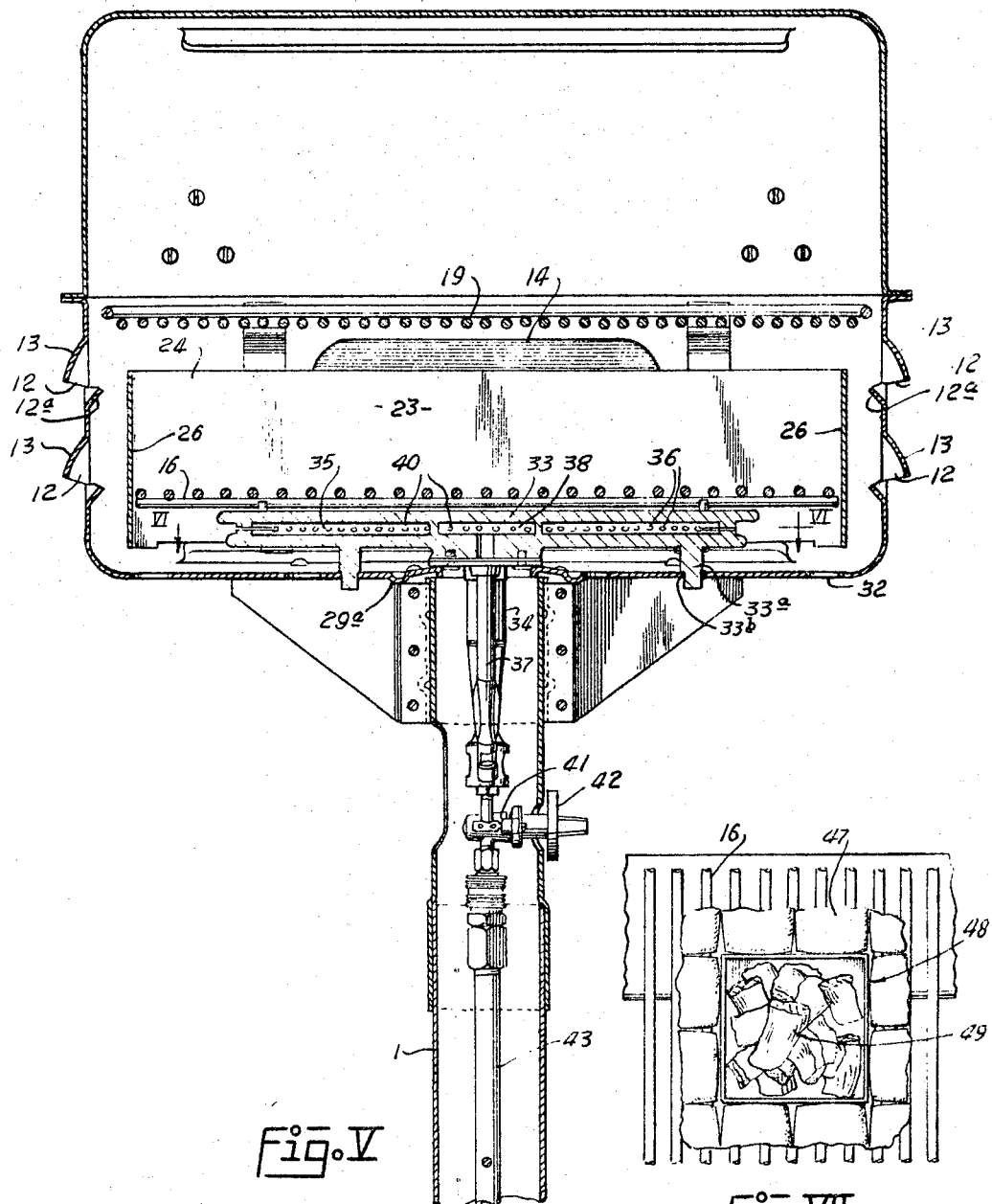
INVENTOR
Roy W. Hanson
Howard E. Moore
ATTORNEY United States Patent Office
3,386,432
Patented June 4, 1968

3,386,432
BARBEQUE GRILL
Roy W. Hanson, 221 Yorktown,
Dallas, Tex. 75208
Filed June 22, 1966, Ser. No. 559,524
12 Claims. (126—41)

ABSTRACT OF THE DISCLOSURE

A gas fired barbeque grill which includes housing having a bottom portion with a burner and refractory body supporting grate disposed in the lower portion and a cooking grid is provided thereabove. A hinged cover is provided above the grid. An annular baffle is provided in the lower portion which extends about and above the burner. A plurality of circulation ports are provided through the sidewall of the lower portion of the housing. The baffle is spaced from the sidewalls and the upper edges extend above the ports so that combustion gases exit through the ports and are shielded from the burner by the grate so that carbon dioxide in the combustion gases does not contact and extinguish the fire. A compartmented burner is provided so that fuel gas can be selectively supplied to the compartments in order to regulate the heat and conserve gas. One side of the grid is adjustable in elevation so that meat juices may drain to one side. The lower wall of the bottom portion of the housing is slanted toward the center and a drainout trough is provided about the burner with a drainout hole therein.

This invention is concerned with a barbeque grill and is particularly concerned with certain improvements in a gas-fired barbeque grill.

So-called gas-fired barbeque grills generally consist of a housing having a hinged cover thereon, with a gas burner in the lower portion of the housing, a grate disposed above the burner with a mass of refractory bodies simulating charcoal briquets disposed on the grate, which bodies are customarily made of ceramic material, and a meat supporting grid supported in the lower portion of the housing above the mass of refractory bodies. The heat of combustion of gas causes the refractory bodies to glow in a manner similar to charcoal, which in turn imparts cooking heat to the meat disposed upon the grid.

Considerable difficulty has been encountered in the use of such gas-fired grills in that the carbon dioxide produced by combustion of the gas causes the saturation of the combustible mixture of air in the housing to such an extent as to extinguish the fire of the burner. This not only resulted in inconvenience but created a safety hazard in that gas could accumulate in the housing after the fire was extinguished to cause the hazard of an explosion.

Furthermore, in such gas-fired grills it was difficult to control the heat produced by the simulated briquets so that the meat had a tendency to sear-over and burn.

It is therefore a primary object of the invention to provide in a gas-fired grill means to prevent the undue exposure of the flame to carbon dioxide and to convey the gases of combustion out of the housing in a manner to prevent undue exposure thereof to the flame to thereby prevent the flame of the burner from being extinguished.

Another important object of the invention is to provide means to regulate the amount of fuel provided to the burner, and thereby the heat supplied to the mass of refractory bodies, and thereby control the heat supplied and the cooking rate.

A still further object of the invention is to provide a means for draining off the drippings from meat disposed upon the grid, to prevent same from dripping onto the mass of refractory bodies which is simple to adjust and operate and positive in its action.

A general object of the invention is the provision of a gas-fired barbecue grill which is safe in its operation and provides for the uniform cooking of food disposed upon the grid thereof.

Other and further objects of the invention will become apparent on reading the detailed specifications hereinafter following and by referring to the drawings annexed hereto.

A suitable embodiment of the invention is shown in the attached drawings wherein:

FIG. I is a front elevational view of the barbecue grill in mounted position;

FIG. II is a side elevational view of the barbecue grill shown in FIG. I;

FIG. III is a top plan view of the bottom portion of the housing, with the grid partially cut away;

FIG. IV is a transverse sectional view of the burner taken on the line VI—VI of FIG. V;

FIG. V is a transverse sectional view taken on the line V—V of FIG. II;

FIG. VI is a transverse sectional view of the burner taken on the line VI—VI of FIG. V;

FIG. VII is a top plan view of the hickory chip container which may be disposed upon the grate; and Numeral references are employed to indicate the various parts shown in the drawings and like numerals indicate like parts throughout the various figures of the drawings.

The numeral 1 indicates a tubular support which may be anchored to the ground 3, by concrete 2.

The housing for the device consists of lower portion 8 arranged to be covered by a cover 9 which is hinged at one edge to the lower portion 8 by means of suitable hinges 10.

The lower portion 8 of the housing is detachably secured to the support 1 by means of a sleeve 4 slidable over the upper end of the support and attachable thereto by means of suitable screws 4a.

The tubular support 4 is secured to an annular plate 5 which is reinforced by the gussets 6 to plate 5, secured to the bottom of the housing by means of bolts and nut combinations 7.

The upper portion 9 of the housing may be rotated upwardly about the hinges 10 by grasping the handle 11.

Elongated vents 12 are provided through the wall at each end of lower portion 8 of the housing, said vents being shielded by arcuate baffles 13 disposed along the upper sides thereof. Inwardly extending baffles 12a extend along the lower edges of the vents 12.

Elongated vents 14 are provided through the rear wall of the lower portion 8 of the housing, said vents being shielded by a deflector baffle 15 along the upper edges thereof. Inwardly extending deflector baffles 14a extend along the lower edges of vents 14.

A grate 16, made up of spaced parallel rod members rigidly welded together is removably supported on brackets 17 secured to the bottom of the lower portion 8 of the housing, said grid having rods 18 welded along the lower opposite edges thereof arranged to overlap the bracket 17 to prevent side-wise movement of the grate with relation to the brackets. A central longitudinally extending reinforcing rod 18a is welded to the lower side of the grate to facilitate heat transfer from end to end thereof.

A foraminous grid 19, which is made up of spaced parallel rods welded together, is removably supported on the brackets 20 and 21 secured to opposite walls of the lower portion of the housing. The bracket 21 has vertically spaced steps 22 thereon so that the inclination of the grid may be varied as shown in broken lines in FIG. IV for the purpose of allowing drippings from the meat disposed upon the grid to drain into the drain out conduit 29, hereinafter described.

An open baffle, generally indicated at 23, includes a rear wall 24 spaced from the rear wall of the lower portion 8 of the housing by means of brackets 25 secured thereto, and end walls 26 are spaced from the end walls of the bottom portion of the housing by the flanges 27 secured thereto. The baffle 23 is open at the front end adjacent to the front wall of the lower portion 8 of the housing It will be observed that the baffle 23 substantially surrounds the grate 16 on which the simulated coals, made of refractory material, are disposed, and that the walls thereof are spaced from the vents 12 and 14 disposed through the rear and end walls of the lower portion of the housing.

It will be noted that the lower wall 28 of the firebox portion 8 is slanted inwardly toward the raised portion 30, through which the burner supply pipes extend, so that the meat drippings will drain toward the center. A drain orifice 29 is provided through the lower wall 28 at the lowest point in a trough or bead 29a so that drippings will drain toward the orifice and out of the housing through same. When the grill 19 is placed in slanted position as shown in broken lines in FIG. IV most of the drippings will adhere to the rods of the grill by surface tension and flow therealong by gravity and be deposited at the outer edge of the bottom 28 so that the greater portion drippings are not deposited on the simulated coals where they would burn and cause flaming to burn and cause the deposit of carbon on the meat being cooked.

If desired a removable receptacle may be attached to the bottom of lower wall 28, or may be disposed on the ground to collect the drippings.

Vents 32 are provided through the bottom wall of the housing to provide air for combustion.

A special burner is indicated generally at 33, which includes a refractory body having a first hollow area 35 therein supplied by gaseous fuel through a first supply pipe 34. Spaced orifices 36 are provided through the wall of the refractory body 33 communicating that the hollow area 35 through which fuel may be dispersed and burned on the outer surface of the body 33.

A second hollow area 38 is provided in the refractory body 33 which is separated from the first hollow area 35 by an enclosure wall 39. The second area 38 is supplied with gaseous fuel through a second supply pipe 37. Orifices 40 are provided through the wall of the refractory body 33 in communication with the hollow area 38 and the outer side of the refractory body through which fuel may be dispersed from the area 38 and burned on the outer side of the refractory body 33. The supply pipes 37 and 34 communicate with a two-way valve, indicated generally at 41, whereby fuel may be alternately admitted to the hollow areas 35 and 38 whereby the burner may be caused to burn by fuel emitted through the orifices 36 along both sides thereof, or by turning the switch to a position to admit fuel only to the hollow area 38, fuel will only be emitted through the orifices 40 and will burn only along the outer surface of the body supplied through said orifices 40.

The two-way valve 41 has a dial 42 thereon which indicates "off" position and "low," "medium" and "high" heat positions.

Gaseous fuel is supplied through the valve 41 to the burner 33 through an upright supply pipe 43 which is in turn supplied from a source of gaseous fuel through a horizontal pipe 44. An air supply vent is provided in the front wall of the housing of the lower portion 8 of the housing, and the air supplied therethrough is controlled by an adjustable damper cover 45.

A temperature gauge 46 is disposed in the front wall of the upper portion 9 of the housing to indicate the temperature within the housing.

A container or pan 48, which is surrounded by simulated briquets 47 of refractory material may be disposed upon the grate 16 so that wood chips 49, such as hickory chips may be placed therein and burned to impart their flavor to the meat being cooked on the grill 19.

The operation and function of the device heretofore described is as follows:

A bed of simulated charcoal briquets 47 are placed on the grate 16. The simulated briquets 47 are made of refractory material, such as ceramic, so that when heated will retain heat, become very hot and act in the manner of charcoal to impart cooking heat to meat disposed upon the grill 19.

Preferably the valve 41 is first manipulated to allow gas to be emitted through the orifice 36 so that a flame will be provided on the edges of the burner 33 and thereby quickly heat the refractory bodies 47 to broiling temperature. However, after the bodies are thus heated, and after the meat on the grill 19 has begun to cook, it is preferable to turn the valve 41 to a position so that gas is only emitted through the orifices 40, so as to restrict the heat provided just sufficiently to maintain the refractory bodies 47 in sufficient heated condition to impart a slow broiling to the meat disposed on the grill without burning same. Thus the heat within the housing may be regulated.

The heat may further be regulated by adjusting the dial 42 on valve to allow more or less gas to be supplied to the pipes 34 and 37.

By disposing the grill 19 in an inclined position as shown in FIG. IV, the drippings from the meat disposed on the grill 19 will be deposited at the outer edge of the bottom of the lower housing portion 8 and will drain into the drain-out orifice 29 and will not be deposited on the simulated briquets 47 to cause flames and undue smoke.

It will be noted that the combustion gases, which contain a major portion of carbon dioxide ($CO_2$) will rise in the housing and seek exit. In seeking exit through the vents 12 and 14 it will pass downwardly between the walls of the housing and the walls of the baffle 23 thereby preventing the combustion gases from coming into contact with the flame about the burner 33 and thereby prevent said combustion gases from extinguishing the flame.

It will be understood that other and further embodiments of my invention may be devised without departing from the spirit and scope of the appended claims.

Having described my invention, I claim:

1. In a broiler, a housing including a lower firebox portion and an upper lid portion; a burner in the lower portion of the housing; a grate disposed above the burner arranged to receive a plurality of refractory bodies; at least one vent through the wall of the lower portion of the housing; a baffle disposed in the lower portion of the housing about the burner, said baffle having walls spaced from the walls of the housing and having upper edges extending above the burner and the vent; and lower edges extending below the vent; and a foraminous grid disposed above the grate.

2. The combination called for in claim 1 wherein the bottom of the firebox is slanted from the outer sides toward the center and a drain out orifice is provided through the said bottom; and means to incline the grid in position so that one edge thereof is lower and disposed over one edge of the bottom to prevent drippings from being deposited on the burner.

3. The combination called for in claim 2 wherein means is provided in one side of the lower portion of the housing to selectively support one side of the grid at different elevations.

4. The combination called for in claim 1 wherein the burner includes an elongated body; a first hollow portion in the body occuping a major portion thereof; orifices through the wall of the body communicating with the first hollow portion; a second hollow portion in the body; orifices through the wall of the body communicating with the second hollow portion, and means to selectively supply fuel to the hollow portions.

5. The combination called for in claim 4 wherein the means to selectively supply fuel to the hollow portions comprises a two-way valve in the fuel supply line.

6. The combination called for in claim 1 with the addition of a chip tray disposed on the grate.

7. In a broiler, a housing including a lower firebox portion and an upper lid portion, said firebox portion having side walls and a lower wall; a burner positioned in the firebox portion of the housing and having a supply pipe extending through the lower wall thereof substantially centrally thereof; a raised portion of the lower wall about the supply pipe; the lower wall of the firebox being slanted from the outer sides toward the raised portion; a drainout channel formed in the lower wall about the raised portion having a drainout passage therein communicating with the outside; a grate disposed above the burner arranged to receive a plurality of reractory bodies; and a foraminous grid disposed above the grate in the lower portion of the housing.

8. The combination called for in claim 7 with the addition of means to incline the grid in position so that one edge thereof is lower and disposed over one edge of the bottom wall to prevent drippings from being deposited on the burner.

9. The combination called for in claim 8 with the addition of means secured to one side of the lower portion of the housing to selectively support one side of the grid at different inclined elevations.

10. The combination called for in claim 9 wherein the means to selectively support one side of the grid at different inclined elevations comprises spaced vertically disposed steps.

11. In a broiler, a housing including a lower firebox portion and an upper lid portion; a burner in the lower portion of the housing; a grate disposed above the burner arranged to receive a plurality of refractory bodies; at least one vent through the wall of the lower portion of the housing, said vent having an inwardly extending deflector at the lower edge thereof and an outwardly extending deflector at the upper edge thereof; a baffle disposed in the lower portion of the housing above the burner, said baffle having walls spaced from the walls of the housing and having upper edges extending above the burner and the vent; and a foraminous grid disposed above the grate.

12. The combination called for in claim 1 wherein the burner includes an elongated body, substantially flat upper and lower surfaces connected at the extremities with arcuate surfaces forming a first fuel dispersal area, orifices in said upper and lower surfaces, a second fuel dispersal area inside the first dispersal area, orifices in the lower surface of said second fuel dispersal area, and means to selectively supply fuel to the hollow portions.

References Cited

UNITED STATES PATENTS

| | | | |
|---|---|---|---|
| 826,967 | 7/1906 | Schneider | 158—105 |
| 1,462,331 | 7/1923 | Festa | 158—105 |
| 1,871,783 | 8/1932 | Friedman | 158—105 |
| 2,164,078 | 6/1939 | Parker | 126—41 |
| 2,898,846 | 8/1959 | Del Francia | 126—41 X |
| 3,033,191 | 5/1962 | Bonadiman | 126—25 |
| 3,088,393 | 5/1963 | Huckabee | 126—25 X |
| 3,244,163 | 4/1966 | McGlaughlin | 126—25 |
| 3,298,361 | 1/1967 | Clark | 126—25 |

FREDERICK L. MATTESON, JR., *Primary Examiner.*

JAMES W. WESTHAVER, *Examiner.*

E. G. FAVORS, *Assistant Examiner.*